A. LAFON.
CHAIN PIPE WRENCH.
APPLICATION FILED SEPT. 27, 1916.

1,237,659.

Patented Aug. 21, 1917.

WITNESSES:
René Bruine
Mary W. Fraser

INVENTOR
Alphonse Lafon

By Attorneys,
Fraser, Dark & Myers

UNITED STATES PATENT OFFICE.

ALPHONSE LAFON, OF SEWAREN, NEW JERSEY.

CHAIN PIPE-WRENCH.

1,237,659. Specification of Letters Patent. Patented Aug. 21, 1917.

Application filed September 27, 1916. Serial No. 122,330.

*To all whom it may concern:*

Be it known that I, ALPHONSE LAFON, a citizen of the United States of America, residing in Sewaren, in the county of Middlesex and State of New Jersey, have invented certain new and useful Improvements in Chain Pipe-Wrenches, of which the following is a specification.

This invention relates to wrenches for turning pipes, bars or the like of the class having a tensile member or members encircling the pipe or bar, such members being commonly constructed as a chain, and wrenches of this type being commonly known as chain pipe wrenches. The invention further relates to those wrenches of this type in which the chain links or gripping members are provided with spurs or teeth for engaging and biting into the surface portion of the pipe.

According to this invention, such spurs or teeth are mounted loosely in sockets in such manner that they may rock as a turning effort is applied by the wrench and thereby more effectively bite into the surface portion of the pipe. The invention provides other features of improvement in wrenches of this class, as will appear from the description.

The accompanying drawings show the preferred embodiment of the invention.

In said drawings,—

Figure 1:
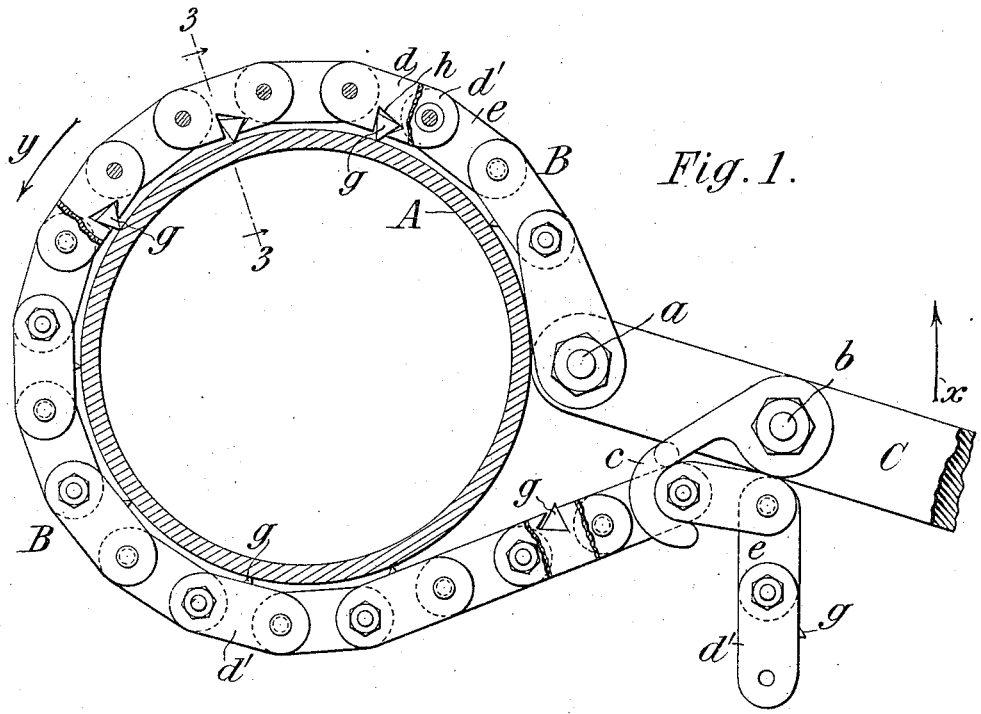
Figure 1 is a side elevation partly broken away, the pipe being shown in section.
Figure 3:
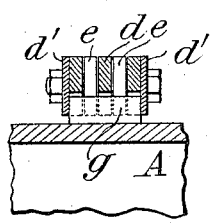
Fig. 3 is a transverse section on the line 3—3 of Fig. 1.
Figure 7:
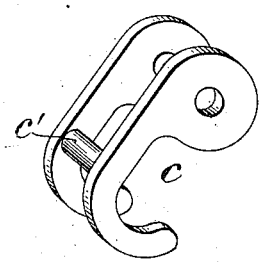
Fig. 7 is a perspective view of the dog $c$.

A, in Figs. 1 and 3 is the pipe, or it may be a solid bar or shaft. B, as a whole, is the chain, and C is the operating lever. The latter is connected in any suitable way to the chain, preferably in the manner shown, namely, by connecting one end of the chain to the end of the lever by means of a bolt or pintle $a$; and by pivoting to the lever on another bolt or pintle $b$ a hook or dog $c$, which may engage any of the links of the chain, being adjusted to provide a longer or shorter encircling portion of the chain according as the pipe is of larger or smaller size. The dog is best constructed as shown in Fig. 7, and has a double hook united by a bar $c'$. The chain is shown as made up of plate links $d$, $e$, united by pins $f$, $f$. The chain is preferably compound, that is, each link consists of two or more plate links $d$ or $e$, and preferably the composite links $d$ are wider than the links $e$ so that the hooked portion of the dog $c$ may enter against the ends of the links $d$ and embrace the links $e$ in the manner common in chain wrenches of this character; but this construction may be varied by the substitution of any of the well known equivalents.

The links $d$, $d$ carry the rocking spurs $g$, $g$. For this purpose the links $d$ are formed with angular sockets or notches $h$. Instead of these sockets making a tight fit with the spurs as has heretofore been proposed, the sockets are made larger than the spurs so that the latter have a certain freedom of motion while yet being unable to escape from the sockets. To prevent their escape endwise, the links $d$ are provided with outer portions or cheek links $d'$, which are unprovided with notches and which consequently form stops against which the ends of the spurs abut, and by which the spurs are confined within the sockets.

In operation, the chain is carried around the pipe, and the dog $c$ is hooked into the chain at such a point as to give the lever C an effective direction for applying rotary force to the pipe. The lever is then moved in the direction of the arrow $x$, Fig. 1, whereby the chain is tightened around the pipe, its spurs $g$, $g$ being brought against the outer surface or perimeter of the pipe. Thus the pipe is engaged at a frequent succession of points around its perimeter so that when the turning stress is applied, the crushing effort of the chain will be so distributed around the pipe that the latter will be able most effectually to resist the crushing tendency. On further moving the lever in the direction $x$, the encircling portion of the chain commences a rotary movement around the pipe in the direction of the arrow $y$, and at the beginning of this movement the several spurs $g$ execute a tilting movement, whereby they are brought into more effective engagement with the pipe.

Figure 5:
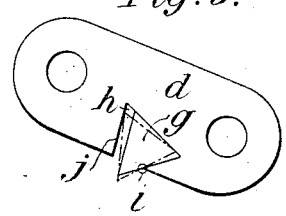
Fig. 5 shows one of the links and spurs on a larger scale and illustrates the rocking movement of the spur.

The nature and effect of this tilting movement may be best understood by reference to Fig. 5. Ordinarily, before the first rotary movement of the chain around the pipe, the spurs will stand in the position shown in full lines, being seated against the bottoms of the angular sockets. As the first turning movement takes place, each spur rocks around the corner $i$ until the rocking movement is stopped by its opposite side abutting against the face $j$ of the socket. This rocking movement causes the spur to swing out so that its active edge, which engages the pipe, protrudes farther from the link, and consequently tends to bite into the pipe. The rocking movement also brings the spur into a more effective angle for engaging the pipe, so as to reduce the liability of slipping. The rocking movement of the spur is thus akin to the straightening of a toggle.

Figure 6:
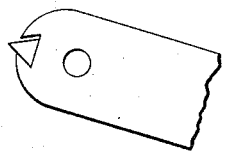
Fig. 6 is a fragment of the operating lever on the same scale as Fig. 5.

While it is preferable to apply the rocking spurs to all of the links $d$, (that is, to every alternating link of the chain), yet it is within my invention to apply such rocking spur to only one link, or to any one part of the gripping portion of the wrench. And it is understood that each link of that portion of the chain encircling the pipe constitutes a gripping member, and also that portion of the operating lever which bears against the pipe may also constitute a gripping member. It is accordingly within my invention to provide such engaging end of the lever with a rocking spur, as shown in Fig. 6. In this connection it is to be observed that my invention, in its broader sense, is not limited to chain pipe wrenches, since instead of a chain, any equivalent encircling and gripping part or parts may be substituted, provided only that at least one element of the gripping member or members shall be provided with a rocking spur or spurs.

Figure 2:
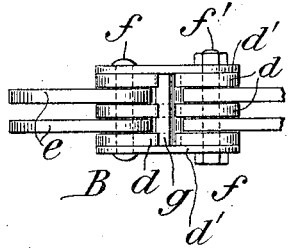
Fig. 2 is a plan of a portion of the chain.
Figure 4:
Fig. 4 is a perspective view of one of the spurs.

It is an important advantage of my invention that the spurs, which are preferably made of hardened steel, while the chain links may best be made of softer metal, may, when their engaging edges become worn or dulled, be removed and turned to bring a new and sharp edge into the working position. To do this it is only necessary to remove the cheek piece $d'$ from one side of the chain, withdraw the spurs, and turn them one-third around, replacing them and replacing the cheek pieces. The pins $f$ may have their heads riveted down, or to facilitate the removal just described, they may be made as screw bolts with nuts, as shown at $f'$, Fig. 2. Preferably, the spurs are made triangular so as to afford three engaging edges which may thus be used one after another. As these edges are the only portions subject to any material wear, this removal gives the wrench a long life, and when all three edges of the spurs are dulled, a new set of spurs may be provided at small expense.

I claim as my invention:—

1. A pipe wrench having means for encircling the pipe and means for tightening such means against the pipe, such encircling means comprising a gripping member having a socket, and a spur having a single engaging edge and mounted loosely in said socket so that it may rock as a turning movement is imparted to the wrench and thereby change the angle of said edge to the pipe.

2. A pipe wrench having means for encircling the pipe and means for tightening such means against the pipe, such encircling means comprising a gripping member having a socket, and a spur mounted loosely in said socket, said member having means for preventing the escape of said spur, comprising a cheek piece closing the end of said socket.

3. A pipe wrench having means for encircling the pipe and means for tightening such means against the pipe, such encircling means comprising a gripping member having a socket, and a triangular spur mounted loosely in said socket so that it may rock therein with one edge projecting from said socket to engage the pipe.

4. A chain pipe wrench comprising a chain and lever, successive links of the chain having sockets, and triangular spurs mounted loosely in such sockets with one edge projecting from the socket to engage the pipe.

5. A chain pipe wrench comprising a chain and lever, a link of the chain having a socket and a spur mounted loosely in such socket, said link having cheek pieces closing the ends of such socket.

6. A pipe wrench having means for encircling the pipe and means for tightening such means against the pipe, such encircling means comprising a gripping member and a spur having an edge for engaging the pipe, loosely carried by said gripping member and movable to swing at its engaging edge into closer engagement with the pipe as the encircling means is displaced around the pipe by the tightening movement.

7. A pipe wrench having means for encircling the pipe and means for tightening such means against the pipe, such encircling means comprising a gripping member having a socket, and a spur loosely mounted in said socket, the socket and spur having such angular relation that as the encircling means is displaced around the pipe by the tightening movement the spur is turned and swings to bring its engaging edge into closer engagement with the pipe.

In witness whereof, I have hereunto signed my name in the presence of two subscribing witnesses.

ALPHONSE LAFON.

Witnesses:
ARTHUR C. FRASER.
CHAS. LYON RUSSELL.